Nov. 6, 1928.
B. DE MATTIA
1,690,624
PROCESS FOR MAKING PNEUMATIC TIRES
Filed Sept. 29, 1925    2 Sheets-Sheet 1
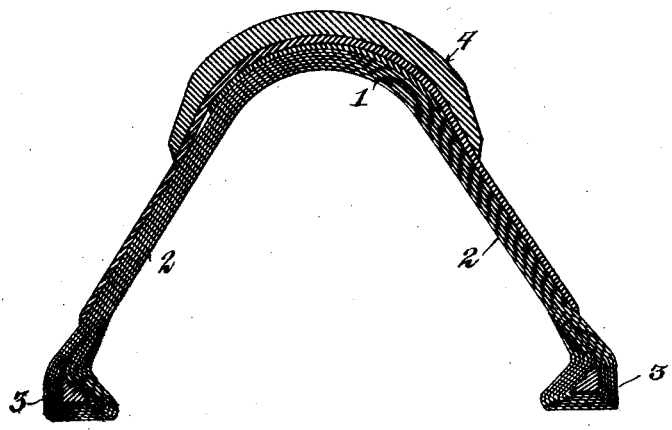
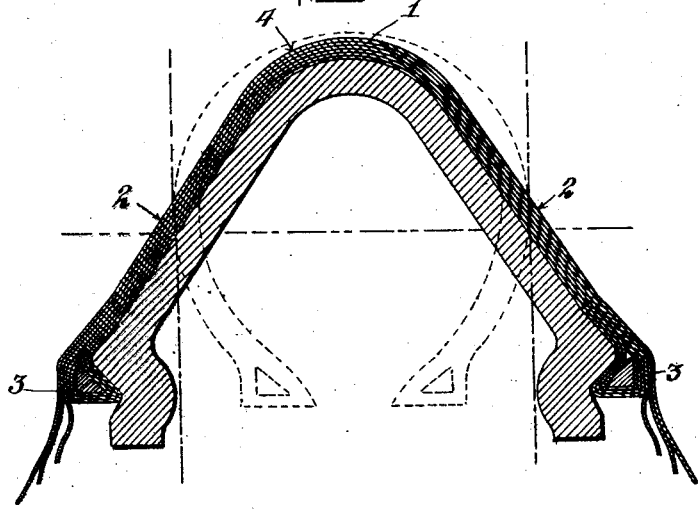
INVENTOR
Barthold De Mattia Nov. 6, 1928.
B. DE MATTIA
1,690,624
PROCESS FOR MAKING PNEUMATIC TIRES
Filed Sept. 29, 1925    2 Sheets-Sheet 2
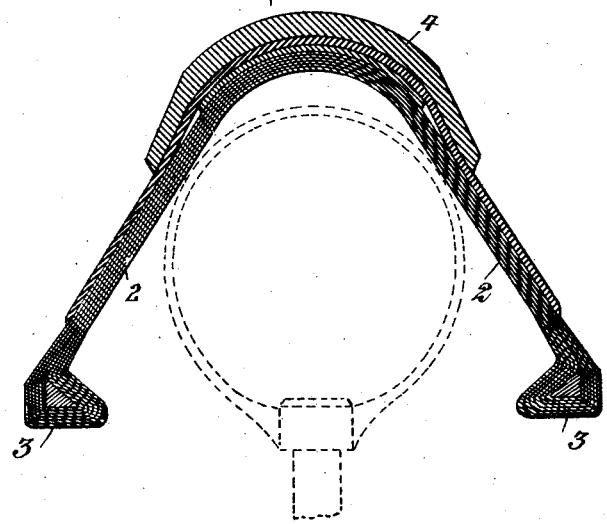
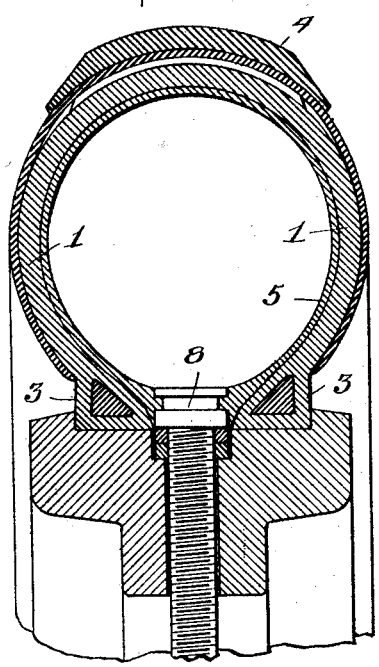
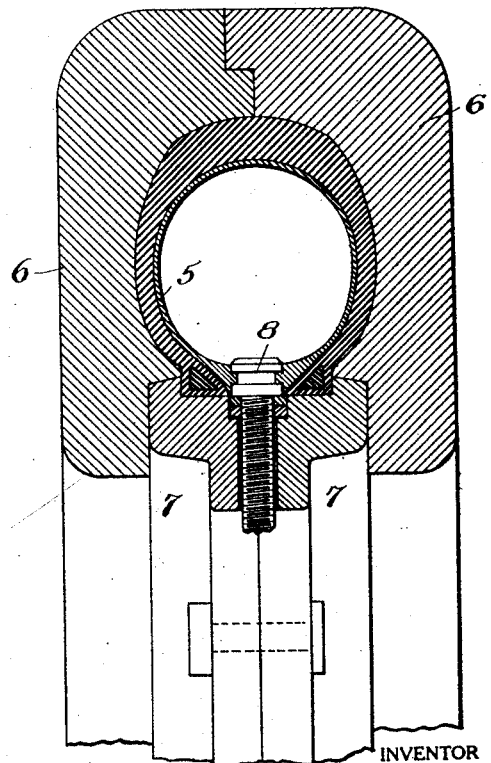

Patented Nov. 6, 1928.

1,690,624

UNITED STATES PATENT OFFICE.

BARTHOLD DE MATTIA, OF CLIFTON, NEW JERSEY, ASSIGNOR, BY MESNE ASSIGNMENTS, TO NATIONAL RUBBER MACHINERY COMPANY, OF AKRON, OHIO, A CORPORATION OF OHIO.

PROCESS FOR MAKING PNEUMATIC TIRES.

Application filed September 29, 1925. Serial No. 59,394.

The present invention relates to a process for making pneumatic tires. More particularly the invention relates to the manufacture of shoes or casings for pneumatic tires, and its object is to greatly facilitate and simplify what is known as the "stitching" of the fabric; in fact to eliminate to a great extent the "stitching" operation.

In U. S. Patent 1,631,855, granted June 7, 1927, I have shown, described and claimed a tire building core adapted for use in carrying out the present process, and in that patent the said process is described in connection with the description of the core constituting the subject-matter of said patent.

The present invention may be said to consist of a process comprising the following steps: First. Building up a shoe or casing with the greater part of its side walls above the beaded edges angularly disposed or inclined with relation to each other with the beaded edges spread apart. Second. Bringing the beaded edges of the "green" or unvulcanized tire toward each other about a form, thus imparting a substantially circular shape in cross section to the tire. Third. Vulcanizing the tire while held in its substantially circular shape in cross section.

The present invention is illustrated in the accompanying drawing in which:—

Fig. 1 shows in cross section a shoe or casing as built up before shaping and vulcanizing.

Fig. 2 shows in cross section an explanatory diagrammatic view.

Fig. 3 shows in cross section the shoe or casing removed from the core upon which it was built up, and with an inflatable core or "air bag" as it is called, shown in dotted lines, inserted therein.

Fig. 4 shows in cross section the shoe or casing with the beaded edges brought together about the inflatable core or "air bag", or substantially the "standard" shape in cross section.

Fig. 5 shows in cross section the shoe or casing and the inflatable core or air bag enclosed within vulcanizing molds for the usual process of vulcanization.

Similar reference characters will be employed throughout the specification and drawing to designate corresponding parts.

As is well known to those skilled in this art, shoes or casings for pneumatic tires are generally built up on cores substantially circular in cross section or of a shape corresponding to the shape in cross section of a standard tire shoe or casing, with the walls above the beaded edges curved, both above and below an imaginary horizontal line cutting a cross section of the shoe or casing at the axis thereof, and with the beads or beaded edges closely approximating each other.

Because of this substantially circular cross sectional shape it is quite difficult to shape, form and stitch the fabric from which the shoes or casings are made, so as to dispose of the fullness developed as and incident to shaping the fabric about the core above the aforesaid imaginary horizontal line, such shaping of the shoe or casing developing considerable fullness below the aforesaid imaginary horizontal line, which of necessity requires a great deal of manipulation and stitching in order that it may be caused to conform to the core surface below the aforesaid imaginary horizontal line, and in properly forming the beaded edges.

In such an operation as heretofore carried out, the wall of the shoe or casing above the beaded edges define arcs of a circle approximating the required circular shape in cross section of the standard tire, whereas in the improved process which will now be described and which, as hereinbefore stated, was described in my co-pending application, the wall of the shoe or casing when first formed and when removed from the tire-building core before vulcanization, has its beaded edges spread and disposed a considerable distance apart, with the walls thereof or the greater portions above the beaded edges flattened and inclined towards each other and towards the crown or tread.

By thus forming or building up the shoe or casing, the fabric from which it is made can be conformed and laid upon the shaping or molding surfaces of the core with very little effort, producing a minimum amount of fullness at or adjacent the beaded edges which may be readily and with little effort pressed and laid in position along and around the beaded edges without employing an extensive "stitching" operation. After the shoe or casing has been thus formed, it is removed from the core and by a suitable device, such as an inflatable core or air bag, and the usual vulcanizing molds given a substantially circular shape in cross section with the beaded edges closely approximating each other, thus changing the shape in cross section and producing the standard tire shape in cross section, after which it is vulcanized in the usual manner.

In the drawing, the shoe or casing 1 is built up of layers of fabric constituting the sidewalls 2, beaded edges 3 and a tread surface 4, in the usual manner, except that as indicated in Figs. 1, 2 and 3, the beaded edges 3 are spread apart for some distance and that the walls 2 above the beaded edges 3 from a point closely approximating the beaded edges are inclined towards each other and merge into the curved crown or tread 4. The tire blank as thus formed may be said to be substantially triangular in cross section, the base of the triangle being an imaginary line connecting the beaded edges. The tire thus formed and as removed from the core upon which it was built is placed upon a shaping core, which may consist of the usual and well known inflatable core or "air bag" 5, see dotted lines Fig. 3. Thereafter, as indicated in Fig. 4, the beaded edges 3 are forced towards each other and the walls 2 caused to approximate in shape the shaping core or "air bag," and the whole assemblage is placed within a suitable vulcanizing apparatus, such as the mold 6, and the "air bag" being inflated in the usual manner, the shoe or casing is caused to conform to the shape of the mold, and while held under pressure it is vulcanized in the usual manner. The vulcanizing mold comprises the usual bead supporting rings 7 and the inflatable shaping core or air bag is provided with the usual valve mechanism 8 by means of which air may be admitted thereto.

The tire is built up in the usual manner and with the diameter at the crown or tread portion substantially that of the completed tire, and of course with the beaded edges exactly the diameter required for the size of tire, and to fit a rim of a given size. In building up a tire the fabric is generally cut on the bias with the threads extending diagonally, those of adjacent superimposed layers crossing each other at substantially a right angle. The mesh or threads immediately adjacent a central circumferential line extending about the crown or tread are opened up or spread in conforming the fabric to the shaping surface of the core. In the old process a considerable fullness is developed in the tire fabric below an imaginary line cutting the horizontal diameter of a cross section of the tire at the widest part (see Fig. 2), which fullness must be gathered in and pressed and stitched to cause it to conform to the under curved surface of the core beneath such imaginary line.

In my process it will have been observed, the beaded edges are spread apart to such a distance that they are outside of vertical lines striking the surface of the core at a point corresponding to the widest diameter (see Fig. 2), so that the walls of the tire from the beads to the tread are substantially flat and inclined with relation to each other; thus there is little or no fullness which is required to be plaited, pressed, stitched and otherwise conformed to the under curved surfaces of the core as in the old process. A tire thus formed is caused to assume approximately the shape in cross section of a standard tire, by moving the beaded edges towards each other so that they will pass from the outer side of vertical lines struck from the widest part of the core to the inner side of such lines. Such movement of the beaded edges automatically causes the wall of the tire below the horizontal line to conform to the under curved surfaces and to assume substantially the shape desired in the finished tire, and this is accomplished without the necessity of taking up the fullness developed in the several layers as the tire is built up. It will be observed also that as the beads or beaded edges are of a fixed diameter and the tread also being of a substantially fixed diameter, the wall of the tire between these points will be caused to bulge or change from an outwardly inclined straight line to an inwardly curved line as the beads pass from the outer side of the vertical lines to the inner side thereof. This preliminary shaping approximates that of the standard tire, and the true shape of the standard tire is effected or produced by the inflation of the air bag which presses the wall of the tire against the molding surface of the vulcanizing mold.

Having described my invention, I claim:—

1. The process of manufacturing a pneumatic tire which consists in building the unvulcanized tire to conform in cross section to an inverted letter V the tread defining the apex and the beaded edges delimiting the tips of the V, in forcing the beaded edges toward each other, in expanding the tire uniformly from the inside thereof to impart to it its ultimate shape and size, and in retaining the tire thus stretched during vulcanization thereof.

2. The process of manufacturing a pneumatic tire which consists in applying a plurality of plies of tire material and a pair of bead-rings to a core of substantially triangular cross-section, stitching the edges of the respective plies to said bead-rings to form a tire blank, removing the so-formed tire blank from the building core, and modifying its shape by applying it to a core of substantially circular cross-section.

3. The process of manufacturing a pneumatic tire which consists in applying a plurality of plies of tire material and a pair of bead-rings to a building core of substantially triangular cross-section, stitching the edges of the respective plies to said bead-rings, removing the so-formed tire blank from the building core, applying the tire blank to an expansible core, modifying the shape of the tire blank by expanding said expansible core, and vulcanizing the blank in such modified shape.

BARTHOLD DE MATTIA.